United States Patent
Talin et al.

(10) Patent No.: US 6,672,925 B2
(45) Date of Patent: Jan. 6, 2004

(54) VACUUM MICROELECTRONIC DEVICE AND METHOD

(75) Inventors: Albert Alec Talin, Scottsdale, AZ (US); James E. Jaskie, Scottsdale, AZ (US); Bernard F. Coll, Fountain Hills, AZ (US)

(73) Assignee: Motorola, Inc., Schaumburg, IL (US)

( * ) Notice: Subject to any disclaimer, the term of this patent is extended or adjusted under 35 U.S.C. 154(b) by 147 days.

(21) Appl. No.: 09/932,642

(22) Filed: Aug. 17, 2001

(65) Prior Publication Data

US 2003/0036332 A1 Feb. 20, 2003

(51) Int. Cl.[7] .................................................. H01J 9/00
(52) U.S. Cl. ........................ 445/49; 313/346 R; 445/24
(58) Field of Search ............................... 445/24, 49, 50, 445/51; 313/309, 310, 311, 346 R, 351

(56) References Cited

U.S. PATENT DOCUMENTS

| | | | | |
|---|---|---|---|---|
| 5,872,422 A | * | 2/1999 | Xu et al. ..................... | 313/311 |
| 5,894,189 A | * | 4/1999 | Ogasawara et al. ......... | 313/310 |
| 6,057,637 A | * | 5/2000 | Zettl et al. .................. | 313/310 |
| 6,249,080 B1 | * | 6/2001 | Komoda et al. ............. | 313/310 |
| 6,286,226 B1 | * | 9/2001 | Jin .............................. | 33/706 |
| 6,316,873 B1 | * | 11/2001 | Ito et al. ..................... | 313/496 |
| 6,340,822 B1 | * | 1/2002 | Brown et al. ................ | 257/25 |
| 6,359,383 B1 | * | 3/2002 | Chuang et al. .............. | 313/496 |
| 6,445,006 B1 | * | 9/2002 | Brandes et al. .............. | 257/76 |
| 6,445,122 B1 | * | 9/2002 | Chuang et al. .............. | 313/495 |
| 6,465,132 B1 | * | 10/2002 | Jin ............................... | 429/231.8 |
| 6,486,599 B2 | * | 11/2002 | Wang et al. ................. | 313/495 |
| 2003/0022428 A1 | * | 1/2003 | Segal et al. ................. | 438/209 |

FOREIGN PATENT DOCUMENTS

EP    WO 02/092505 A2  * 11/2002  .................. 445/24

OTHER PUBLICATIONS

"Carbon Nanotubes as Molecular Quantum Wires," Dekker, 1999 American Institute of Physics, May 1999, pp. 22–28.
"Carbon Nanotube–Based Field–Emission Displays for Large–Area and Full–Color Applications," Lee et al, Jpn J. Appl. Phys. vol. 39, 2000, pp. 7154–7158. Dec. 2000.

* cited by examiner

*Primary Examiner*—Dean A. Reichard
*Assistant Examiner*—Adolfo Nino
(74) *Attorney, Agent, or Firm*—William E. Koch

(57) ABSTRACT

A vacuum microelectronic device (10,40) emits electrons (37) from surfaces of nanotube emitters (17, 18). Extracting electrons from the surface of each nanotube emitter (17) results is a small voltage variation between each emitter utilized in the device (10, 40). Consequently, the vacuum microelectronic device (10,40) has a more controllable turn-on voltage and a consistent current density from each nanotube emitter (17,18).

12 Claims, 3 Drawing Sheets

VACUUM MICROELECTRONIC DEVICE AND METHOD

BACKGROUND OF THE INVENTION

The present invention relates, in general, to electronics, and more particularly, to electron emission devices.

One of the recent advances in vacuum microelectronics led to the use of nanotubes as electron emitters. Typically, nanotubes are fine filaments made from carbon as disclosed by Cees Deckker, Carbon Nanotubes as Molecular Quantum Wires, Physics Today, pp. 22–28, May 1999. The nanotubes can be applied to a substrate to function as electron emitters.

Typically, the nanotubes disposed on the substrate have differing lengths and also a random orientation, thus, the distance from the electron accumulation anode to each nanotube varies. The current versus voltage characteristics for each nanotube is determined by the nanotube length and the distance from the end or tip of the nanotube to the anode. Because each of the nanotubes have different lengths, different voltages are required to produce electron emission from each nanotube. One nanotube emitter may require a higher voltage to produce electron emission than an adjacent nanotube emitter that has a longer length. Voltage required to produce electron emission generally varies greater than one hundred percent from one nanotube emitter to another. This voltage variation makes it difficult to control the turn-on voltage of a vacuum microelectronic device utilizing the nanotube emitters.

Accordingly, it is desirable to have a method of forming nanotube emitters that provides a low voltage variation (generally less than ten percent) between the nanotube emitters.

BRIEF DESCRIPTION OF THE DRAWINGS

For simplicity and clarity of illustration, elements in the figures are not necessarily to scale, and the same reference numbers in different figures denote the same elements. Additionally, descriptions and details of well known steps and elements are omitted for simplicity of the description.

DETAILED DESCRIPTION OF THE DRAWINGS

Previous nanotube emitters generally are intended to be positioned so that one end points in a direction generally perpendicular to the anode that accumulates the electrons emitted by the nanotubes. Such a configuration is shown in FIG. 9 of a paper by Nae Sung Lee et al, Carbon Nanotube-Based Field Emission Displays for Large Area and Full Color Applications, Japan Journal of Applied Physics, Vol 39, pp. 7145–7158, December 2000. As shown, one end of each nanotube is attached to the substrate and an opposite end or tip emits electrons toward an anode.

The present invention provides for a novel nanotube emitter formed by a novel method. The nanotube emitters are formed to emit electrons generally along the surface of the nanotube emitter instead of from the ends. Such a formation method provides a low variation in the voltage required to extract electrons from adjacent nanotube emitters. The nanotube emitters can be used for various vacuum microelectronic devices including field emission displays, Radio Frequency (RF) devices including RF amplifiers, X-Ray sources, and radiation hardened electronics.

Figure 1:
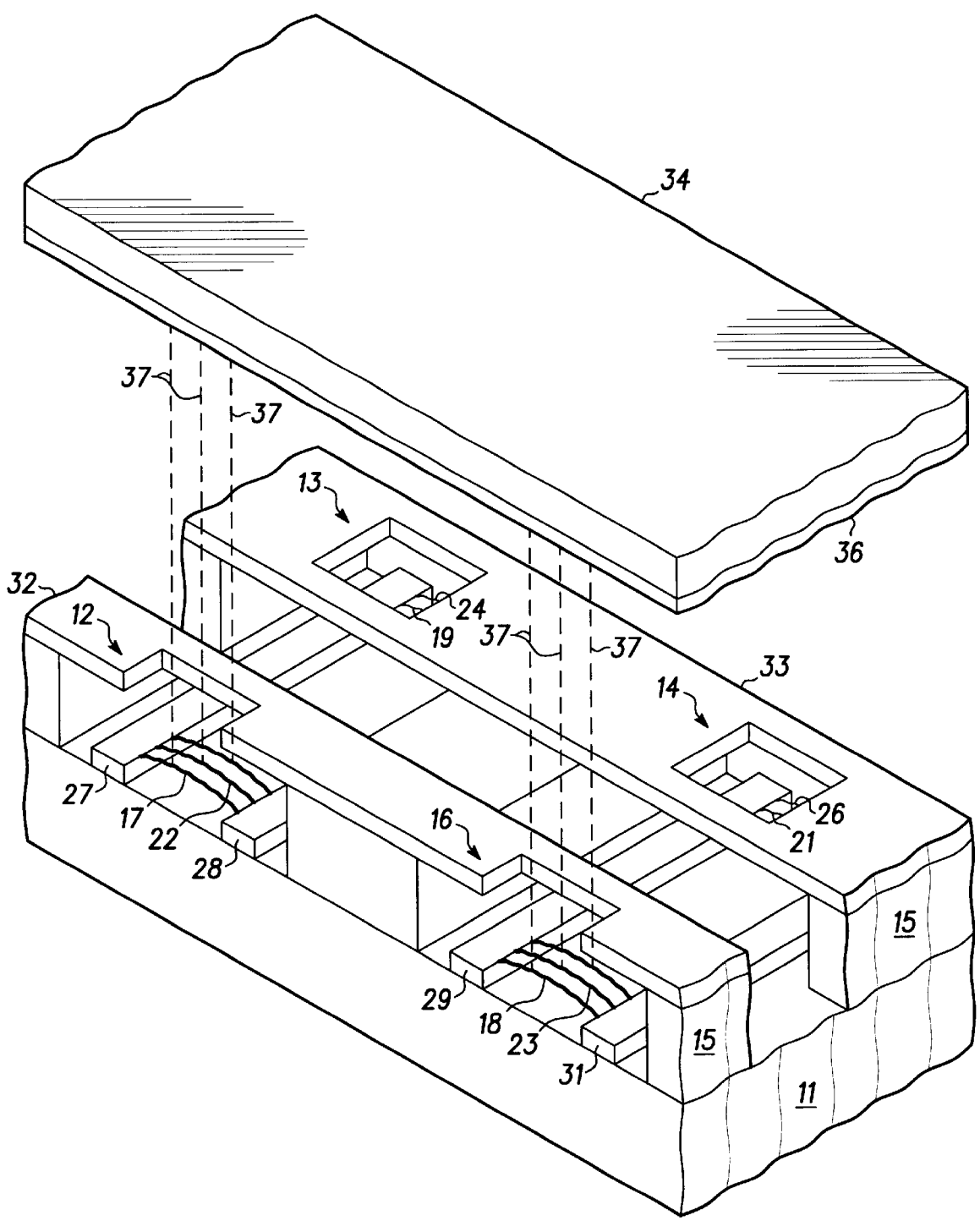
FIG. 1 schematically illustrates an enlarged cross-sectional isometric portion of an embodiment of a vacuum microelectronic device in accordance with the present invention.

FIG. 1 schematically illustrates an enlarged cross-sectional isometric portion of an embodiment of a vacuum microelectronic device 10 having nanotube emitters formed in accordance with the present invention. In the preferred embodiment, device 10 is a field emission display vacuum microelectronic device. Device 10 includes a substrate 11 upon which nanotube emitters are formed. Typically, substrate 11 is an insulating material such as glass, including soda-lime glass, or other suitable material such as ceramic or semiconductor materials. At least one attachment site 12 is formed on substrate 11 at a place where nanotube emitters are to be positioned. Attachment site 12 typically is an area on substrate 11 that underlies a site where nanotube emitters are formed and provides support for the nanotube emitters. In the preferred embodiment, a plurality of attachment sites 12, 13, 14, and 16 are formed on a surface of substrate 11. Those skilled in the art will note that substrate 11 may include several layers including conductor layers, semiconductor layers, and dielectric layers under site 12.

A pair of conductors 27 and 28 are formed on the surface of substrate 11 at site 12 to provide electrical connection to and support for the nanotube emitters. In the preferred embodiment, conductors 27 and 28 extend across the surface of substrate 11 to site 13 and other sites of the plurality of attachment sites on substrate 11. In this preferred embodiment, another pair of conductors 29 and 31 are formed on the surface of substrate 11 at sites 14 and 16. Conductors 29 and 31 may extend further across substrate 11 to other attachment sites. As will be seen hereinafter, electrical contact to a nanotube emitter may be formed to have various other shapes and implementations.

At least one nanotube emitter 17 is formed at site 12 to function as a source of electrons. In one embodiment, at least one nanotube emitter 17, 19, 21, and 18 is formed at each of the plurality of sites 12, 13, 14, and 16, respectively. In the preferred embodiment, a plurality of nanotube emitters is formed at each site. For example, a plurality of nanotube emitters 17 and 22, 19 and 24, 21 and 26, and 18 and 23 are formed at sites 12, 13, 14, and 16, respectively. For simplicity of the explanation, emitters 22, 24, 26, and 23 are illustrated by dashed lines. Emitters 17, 19, 22, and 24 are formed in a position so that ends of each emitter are proximal to conductors 27 and 28 and so that emitters 17, 19, 22, and 24 form electrical contact to conductors 27 and 28. Conductors 27 and 28 also function as a support for emitters 17, 19, 22, and 24. Emitters 18, 21, 23, and 26 along with conductors 29 and 31 are formed similarly to conductors 27 and 28 and emitters 17, 19, 22, and 24. Emitters 17, 18, 19, 21, 22, 23, 24, and 26 can be a variety of conductor materials including metals, such as molybdenum, and tungsten, and semiconductor materials, such as indium phosphide and silicon. Conductors 27 and 28 are formed by various techniques that are well know to those skilled in the art including CVD deposition and screen printing.

A dielectric 15 is disposed on substrate 11 and assists in positioning a gate electrode 32 and a gate electrode 33 proximal to emitters 17, 18, 19, 21, 22, 23, 24, and 26. Dielectric 15 insulates electrodes 32 and 33 from the emitters and also spaces electrodes 32 and 33 apart from the emitters. Electrodes 32 and 33 are formed on the surface of dielectric 15 and function to assist in controlling the transit of electrons extracted from the emitters. An anode 34 is formed to overly and be spaced apart from the emitters. Anode 34 functions as an electron collection site for electrons emitted by the nanotube emitters. In the preferred embodiment, a phosphor coating 36 is disposed on a surface of anode 34 to provide visual indication of the electrons striking anode 34. Dielectric 15, gate electrodes 32 and 33, and anode 34 are formed by various well known techniques.

Emitters 17, 18, 19, 21, 22, 23, 24, and 26 are positioned so that electrons are extracted from the surface of each emitter. Generally, positioning the emitters transverse to anode 34, and often transverse substrate 11, facilitates such electron extraction. Extracting electrons from the surface of each emitter provides a larger emission area for each emitter when compared to prior art emitters that only emit electrons from an end of a nanotube emitter. Additionally, each of emitters 17, 18, 19, 21, 22, 23, 24, and 26 is generally in the same plane, thus, the distance from the surface of each emitter to anode 34 is substantially the same for each of emitters 17, 18, 19, 21, 22, 23, 24, and 26. The emitters are formed between conductors 27 and 28 and between conductors 29 and 31 by techniques that are well known to those skilled in the art. During the formation of each emitter, the emitter forms generally along this transverse direction. However, because of the material characteristics and formation methods there may be variations in the direction at any point along the length of each emitter, although the direction is generally transverse to anode 34 and substrate 11. Consequently, emitters 17, 18, 19, 21, 22, 23, 24, and 26 emit electrons in a direction extending from the surface of the emitters in a direction generally toward anode 34. The distance from anode 34 to each of emitters 17, 18, 19, 21, 22, 23, 24, and 26 typically varies by less than two to thirty percent. In the preferred embodiment, the distance varies by less than ten percent. This small variation in distance results in a corresponding small variation in the voltage required to extract electrons from each of emitters 17, 18, 19, 21, 22, 23, 24, and 26.

In operation, a first voltage, typically a low voltage such as a ground potential, is applied to nanotube emitters 17, 18, 19, 21, 22, 23, 24, and 26. A second voltage, generally a high voltage, is applied to anode 34 to extract electrons from nanotube emitters 17, 18, 19, 21, 22, 23, 24, and 26. Electrons are extracted from the surfaces of nanotube emitters 17, 18, 19, 21, 22, 23, 24, and 26 as illustrated by dashed lines 37. A control voltage is applied to gate electrodes 32 and 33 to assist in controlling the flow of electrons form nanotube emitters 17, 18, 19, 21, 22, 23, 24, and 26 to anode 34. Conductors 27 and 28, and 29 and 31, often functions as row conductors to provide matrix addressing in applications such as field emission display devices.

Also, emitter 17 could be operated in a thermionic or Schottky operating mode by applying different voltage potentials to conductors 27 and 28. This small voltage difference could provide a small current flow through emitter 17 in order to assist thermionic emission from emitter 17. For example, emitter 17 can be heated to a temperature of one thousand to fifteen hundred degrees Celsius (1000–1500° C.) for Schottky operation or eighteen hundred to two thousand degrees Celsius (1800–2000° C.) for thermionic operation. Typically, the current density through emitter 17 is less than $1 \times 10^8$ amps per square meter for such operation. Such current density may be provided by applying a voltage difference between one to five volts between conductors 27 and 28. Additionally, the ability to pass a current through emitter 17 facilitates desorbing contaminants from emitter 17 prior to operating emitter 17. Desorbing emitter 17 further minimizes operating variations between electron emitters. Those skilled in the art will note that emitters 18, 19, 21, 22, 23, 24, and 26 could also be operated in a similar manner.

The surface area from which electrons are extracted depends on the length and diameter or width of the nanotube emitter. The surface area is usually established in order to provide sufficient electron emission for a particular application and physical configuration without damaging the nanotube emitter. Emitter lengths and diameters often vary from about 0.01 to 50.0 micro-meters (length) and 0.002 to 5.0 micrometers (diameter), respectively.

Figure 2:
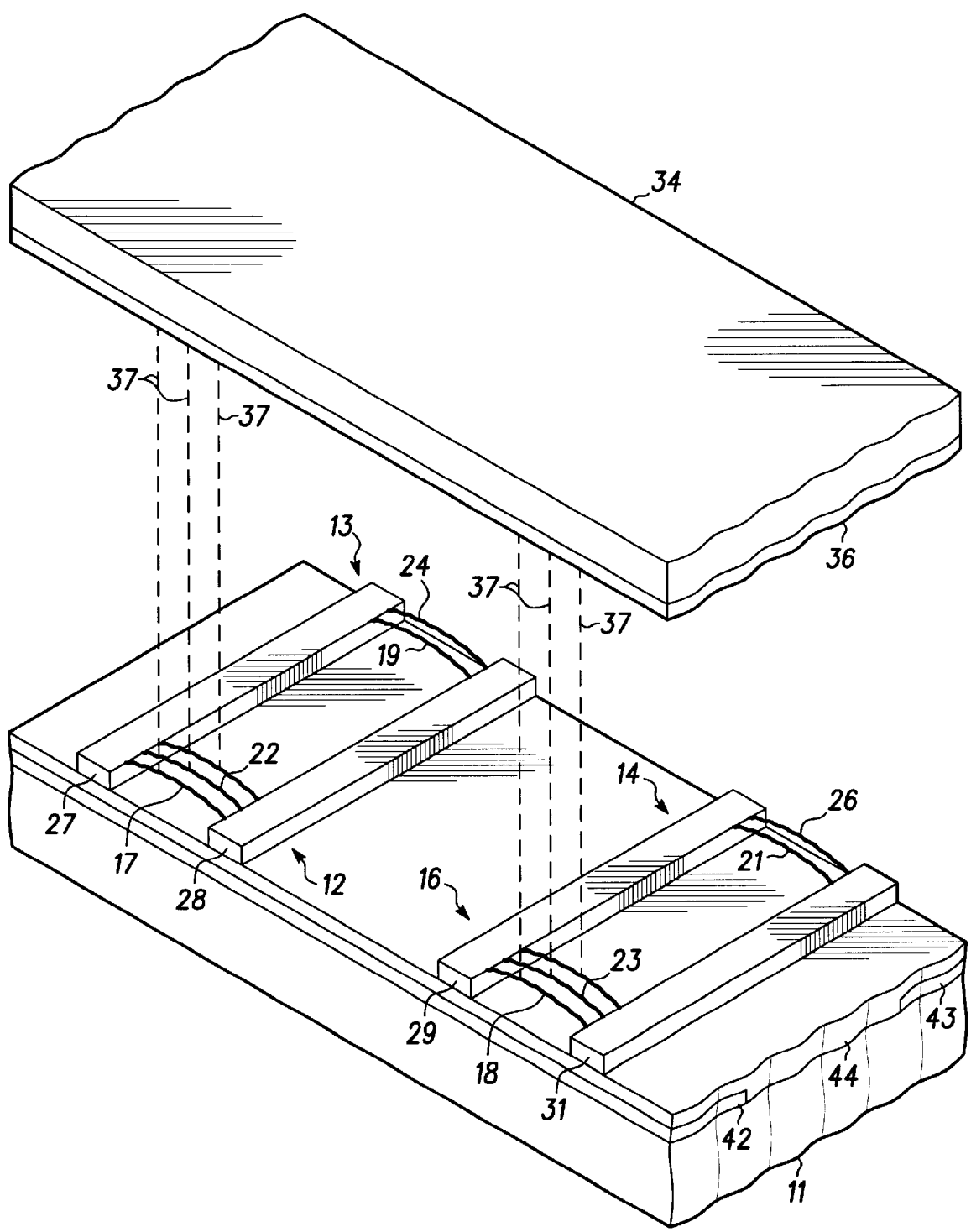
FIG. 2 schematically illustrates an enlarged cross-sectional isometric portion of an alternant embodiment of a vacuum microelectronic device in accordance with the present invention.

FIG. 2 schematically illustrates an enlarged cross-sectional isometric portion of a vacuum microelectronic device 40 that is an alternant embodiment of vacuum microelectronic device 10 shown in FIG. 1. Gate electrodes 42 and 43 are formed on the surface of substrate 11. A dielectric 44 is formed covering electrodes 42 and 43. Although not shown in FIG. 2, another dielectric may also be disposed between substrate 11 and electrode 42. Dielectric 44 often extends to also cover exposed surfaces of substrate 11 that are between electrodes 42 and 43. Thus, gate electrodes 42 and 43 are formed underlying nanotube emitters 17, 18, 19, 21, 22, 23, 24, and 26. Forming the gate electrodes under the nanotube emitters reduces the manufacturing steps required to form device 40 thereby lowering the cost of device 40, for example, the nanotubes may be formed as one of the last manufacturing steps thereby minimizing damage to the nanotubes. Dielectric 44 and electrodes 42 and 43 are formed by methods that are well known to those skilled in the art.

Figure 3:
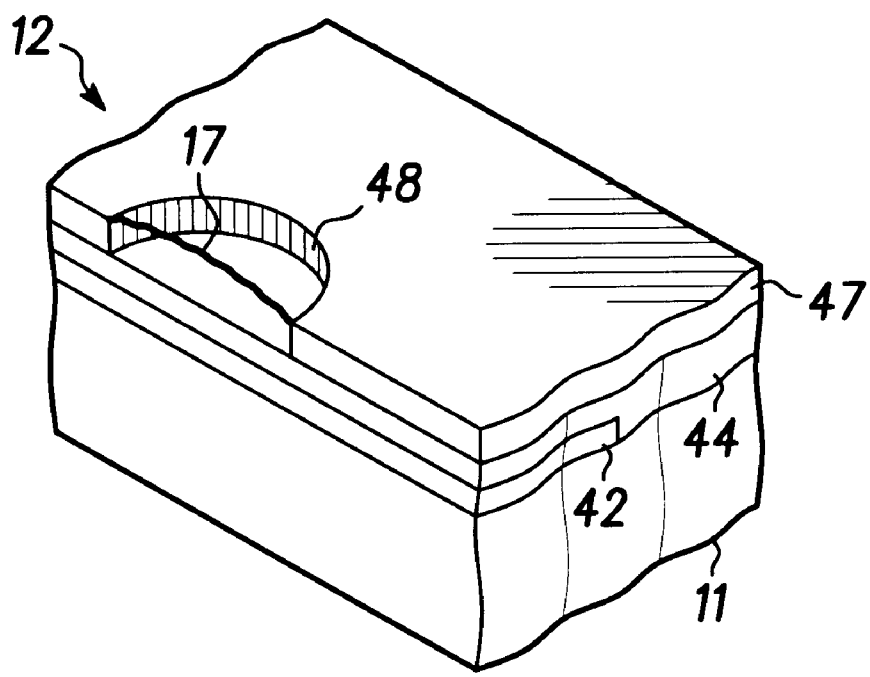
FIG. 3 schematically illustrates an enlarged cross-sectional isometric portion of an alternant embodiment of a nanotube emitter in accordance with the present invention.

FIG. 3 schematically illustrates an enlarged cross-sectional isometric portion of a microelectronic device 50 that is an alternate embodiment of device 40 illustrated in FIG. 2. Gate electrode 42 is formed to overlie substrate 11 at site 12 to facilitate controlling electrons emitted by emitter 17. Electrode 42 typically traverses the surface of substrate 11 to provide such control at other sites such as sites 13, 14, and 16 as illustrated in FIGS. 1 and 2. Electrode 42 often functions as a conductor to assist in providing matrix addressing in applications such as field emission display devices. Dielectric 44 is disposed to overlie electrode 42 in order to insulate electrode 42 from other elements of device 50. Although not shown in FIG. 3, another dielectric may also be disposed between substrate 11 and electrode 42.

A support conductor 47 is formed on dielectric 44 and will function to support emitter 17 and to provide electrical connection to emitter 17. An opening 48 is formed through conductor 47 at site 12 to overlie electrode 42 in order to facilitate forming emitter 17. Emitter 17 is formed across opening 48 to electrically contact conductor 47 proximal to ends of emitter 17 in a manner similar to forming emitter 17 as illustrated in FIGS. 1 and 2. It will be noted by those skilled in the art that any of nanotube emitters 18, 19, 21, 22, 23, 24 and 26 may be formed utilizing a similar supporting conductor 47. Additionally, those skilled in the art will note that gate electrode 32 shown in FIG. 1 may be utilized instead of electrode 42.

By now it should be appreciated that there has been provided a novel way to form a vacuum microelectronic device. Forming nanotube electron emitters to emit electrons generally along the surfaces of the emitters instead of from the ends or tips results in a small variation in the distance from the anode to each electron emitter. Thus the voltage required to extract electrons from each electron emitter also varies by only a small amount. This small voltage variation assists in easier control of the turn-on voltage of the vacuum microelectronic device that is formed using this method. Extracting electrons from the surfaces also provides a large emission surface for each emitter, thus, fewer emitters are required to provide a given current density flow to the anode. The vacuum microelectronic devices utilizing the method can be used for a variety of applications including field emission displays, Radio Frequency (RF) devices including RF amplifiers, X-Ray sources, diodes, amplifiers including triodes and pentodes, and radiation hardened electronic devices.

While the invention is described with specific preferred embodiments, it is evident that many alternatives and variations will be apparent to those skilled in the semiconductor arts. More specifically those skilled in the art understand that the vacuum microelectronic device may have several attachment sites such as site 12 and corresponding electron emitters formed thereon in order to form a field emission display device or other vacuum microelectronic device.

What is claimed is:

1. A method of forming a vacuum microelectronic device comprising:

forming at least one nanotube emitter having ends and further including electrically contacting the at least one nanotube emitter proximal to the ends; and extracting electrons from surfaces of the at least one nanotube by applying a first voltage to one end of the at least one nanotube emitter and a second voltage to another end of the at least one nanotube emitter.

2. The method of claim 1 wherein forming the at least one nanotube emitter includes forming the at least one nanotube emitter overlying a substrate and further including:

disposing a gate electrode proximal to the at least one nanotube emitter; and disposing an anode overlying the at least one nanotube emitter.

3. The method of claim 2 further including forming the gate electrode overlying the at least one nanotube emitter and having an opening through the gate electrode wherein the opening overlies a portion of the at least one nanotube emitter.

4. The method of claim 1 wherein extracting electrons from surfaces of the at least one nanotube emitter includes applying a voltage proximal to the ends.

5. The method of claim 1 wherein electrically contacting the at least one nanotube emitter includes forming electrical contacts to the at least one nanotube emitter in a first plane.

6. The method of claim 5 wherein forming the at least one nanotube emitter includes forming the at least one nanotube emitter overlying a substrate and further including:

disposing a gate electrode proximal to the at least one nanotube emitter and coplanar to the first plane; and disposing an anode overlying the at least one nanotube emitter and coplanar to the first plane.

7. The method of claim 1 further including heating the at least one nanotube.

8. A method of forming a vacuum microelectronic device comprising:

providing a substrate having a plurality of attachment sites;

forming at least one nanotube emitter overlying each attachment site, the at least one nanotube emitter having ends; and electrically contacting the at least one nanotube emitter proximal to the ends; and extracting electrons from surfaces of the at least one nanotube by applying first voltage to one end of the at least one nanotube emitter and a second voltage to another end of the at least one nanotube emitter.

9. The method of claim 8 further including applying the same voltage to the ends of the at least one nanotube emitter.

10. The method of claim 8 wherein electrically contacting the at least one nanotube emitter includes forming electrical contacts to the at least one nanotube emitter in a first plane.

11. The method of claim 8 further including disposing a gate electrode proximal to the at least one nanotube emitter, and disposing an anode overlying each attachment site.

12. The method of claim 8 further including heating the at least one nanotube emitter.

\* \* \* \* \*